United States Patent [19]
Ross

[11] 3,936,921
[45] Feb. 10, 1976

[54] APPARATUS FOR INSTALLING COIL SPRINGS

[76] Inventor: Joseph Kenneth Ross, Rte. 2 Box 124D, Rockwall, Tex. 75087

[22] Filed: May 19, 1975

[21] Appl. No.: 578,515

[52] U.S. Cl. ................................................. 29/227
[51] Int. Cl.² ............................................ B23P 19/04
[58] Field of Search ............... 29/227, 225; 254/10.5

[56] References Cited
UNITED STATES PATENTS

| | | | |
|---|---|---|---|
| 2,652,625 | 9/1953 | Perkins | 29/227 |
| 3,051,443 | 8/1962 | Castoe | 29/227 X |
| 3,368,288 | 2/1968 | Bell | 29/227 |
| 3,817,549 | 6/1974 | Bohannon et al. | 29/227 |

Primary Examiner—James L. Jones, Jr.
Attorney, Agent, or Firm—James C. Fails

[57] ABSTRACT

Disclosed herein is an apparatus for installing coil springs about a central longitudinal shaft, as for shock absorbers. The apparatus comprises a lever arm having one end that separates into a fork with two tines. A detachable pin is located at the end of the tines to provide a coupling with the shaft. A shank is mounted pivotally between the tines of the fork. Shoes on either end of the shank are inclined at opposite angles to mate evenly with coils of a spring. Applying force to the lever arm lowers the shoes, compressing the springs and allowing a keeper to be withdrawn.

5 Claims, 5 Drawing Figures

U.S. Patent    Feb. 10, 1976    3,936,921
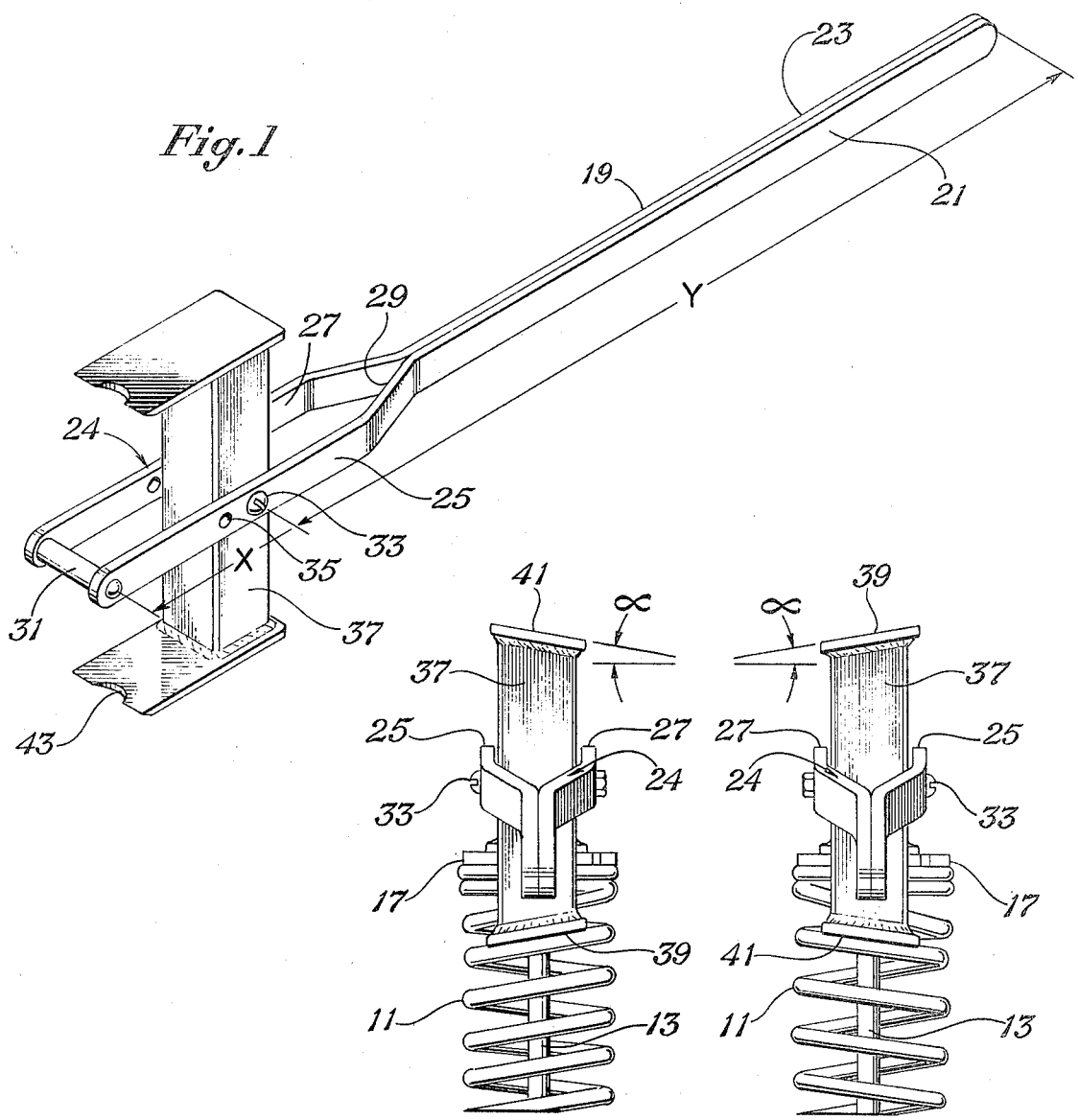
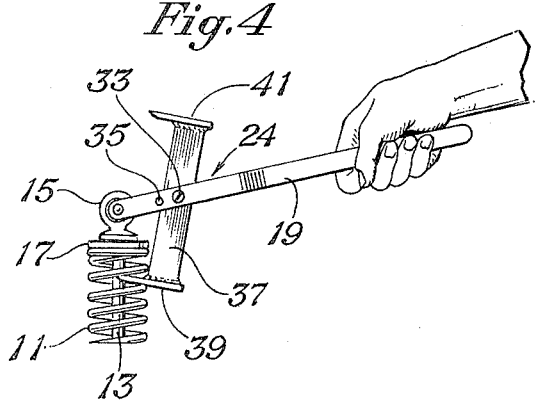
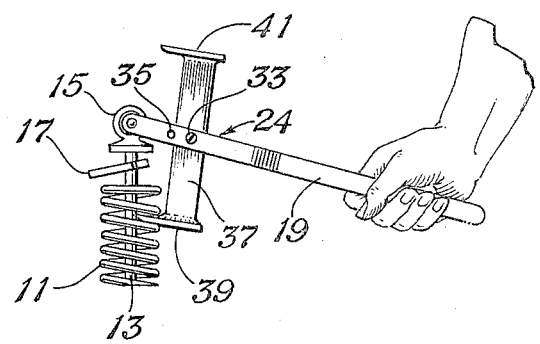

APPARATUS FOR INSTALLING COIL SPRINGS

BACKGROUND OF THE INVENTION

1. Field of the Invention

This invention relates to an apparatus for installing coil springs over a central longitudinal shaft, as in shock absorbers; and, in particular, to motorcycle shock absorbers.

2. Description of the Prior Art

Many types of shock absorbing means include a hydraulic damping absorber encircled by a coil spring. Often, the coil spring and the damping absorber are attached together as a separate unit, particularly rear shock absorbers on motorcycles. Normally with the damping absorber extended full length, the coil spring is under some compression.

To remove the spring for replacement or repair to the damping absorber, additional compression must be applied while a keeper, or whatever device that holds the spring under compression, is removed. To install a spring, it must be compressed while the keeper is inserted.

Compressing the spring can be difficult since a required force for compressing the spring the necessary distance may be as high as 150 pounds. Without a special tool, normally two or three men using screwdrivers are needed to perform the installation. Such prior art operations not only require a relatively large number of man hours; but, also, accidents are more likely to occur during such multiple men operations.

SUMMARY OF THE INVENTION

It is accordingly an object of this invention to provide an improved apparatus for installing or removing a compressed spring encircling a shaft.

It is also an object to provide an improved apparatus for installing or removing a coil spring from a motorcycle shock absorber.

These and other objects will become apparent from the descriptive matter hereinafter; particularly, when taken in conjunction with the appended drawings.

In accordance with the objects a lever arm is provided with a bifurcated end analogous to the tines of a fork for coupling with the top of the damping absorber shaft. A shank is mounted pivotally between the tines of the fork. Shoes are located at either end of the shank for engagement with the coil spring. The shoes are inclined to mate evenly with the coils, one shoe for right hand winding and the other for left hand winding.

BRIEF DESCRIPTION OF THE DRAWINGS

FIG. 1 is an isometric view of an apparatus in accordance with the principles of this invention.

FIG. 2 is an end elevational view of the apparatus of FIG. 1 and a fragmentary view of a left hand coil spring shock absorber.

FIG. 3 is an end elevational view of the apparatus of FIG. 1 and a fragmentary view of a right hand coil spring shock absorber.

FIG. 4 is a side elevational view of the apparatus of FIG. 1 and a fragmentary view of a coil spring shock absorber, prior to actuating the apparatus.

FIG. 5 is a view of FIG. 4 after the apparatus has been actuated to remove the spring keeper and allow subsequent removal of the spring.

DESCRIPTION OF THE PREFERRED EMBODIMENT

FIGS. 2-5 show a portion of a typical coil spring shock absorber for a motorcycle. Coil spring 11 encircles the damping absorber (not shown) and its shaft 13. Stops (not shown) at the bottom of the damping absorber provide a seat for the coil spring 11.

As shown more clearly in FIGS. 4-5, a eye 15 is welded or screwed to the top of shaft 13. Eye 15 has a passage (not shown) for inserting a bolt or pin, normally fastened to a motorcycle frame. Often the eye is of smaller diameter than the inner diameter of the coil spring so that the spring can be slipped over it.

A keeper 17 is located between the coil spring 11 and the eye 15 and serves to restrain the spring in compression. The keeper 17 is a flat metal disc of a "C" shape, having a slot for the shaft 13 to extend through. To remove the coil spring, as shown in FIG. 5, the coil spring 11 must be further compressed and the keeper 17 withdrawn.

The apparatus to perform the function of adding further compression as shown in all the figures includes a lever arm 19, FIG. 1. The lever arm 19 is sufficiently long to give a substantial leverage advantage, and thick enough to provide a comfortable grip. In the preferred embodiment, it is formed of two metal strips 21, 23 adhered together.

At the forward end of the lever 19, the strips separate into a fork 24 with two tines 25, 27. These tines 25, 27 separate into a "Y" shaped portion, designated as 29, then bend and extend generally parallel to each other and the lever arm 19. A pin 31 is inserted across the tines into holes adjacent the forward ends of the tines 25, 27. The pin is held by frictional engagement and is easily removed or detached.

A bolt 33 is inserted across the tines 25, 27 through holes between the pin 31 and lever arm 19. Additional holes 35 are provided for the bolt 33 should a different position be desired for different size coil springs. The bolt 33 serves as a pivotal mounting for a shank 37.

The lengths and strengths of the respective lever arm 19 and tines 25 and 27 are proportioned such that the required compressive force on the spring is readily obtained with only nominal force on the lever arm 19.

For discussion purposes, the distance from bolt 33 to the end of lever arm 19 is labeled Y, FIG. 1; and the distance from bolt 33 to the pin 31 is labeled X. The ratio Y/X should be at least 4. Ratios Y/X larger than 15 are not necessary and result in a long, cumbersome tool. I have found that a ratio Y/X of about 7-8 is nearly ideal, allowing compressing a typical spring requiring 150 pounds with an easily attainable force of only about 20 pounds on lever arm 19. The members extending over the distance Y have a length in the range of 6-24 inches (15-60 centimeters); a thickness in the range of ¼-¾ inch (⅝-2 centimeters); a height, or width, in the range of ¼-1 inch (⅝-2.5 centimeters). The distance X is in the range of 1-3 inches (2.5-7.6 centimeters). In the illustrated embodiment the distance Y is 14 inches and the distance X is 2 inches, and allow easily applying the requisite force to shank 37.

Shank 37 is formed of a straight piece of square metal tubing with its longitudinal axis extending transverse to the longitudinal axis of lever arm 19. Bolt 33 extends through the shank to hold it pivotally to the tines 25, 27 of the fork. The shank 37 is mounted at a selected distance from the end of the fork, the distance being slightly greater than the coil spring 11 radius. The length of the shank may vary, but must be long enough for its ends to be placed adjacent coils of the spring 11 while coupled to the shock absorber.

Shoes 39, 41 are affixed to respective ends of the shank 37 for engaging the coils of the spring for compression. Each shoe 39, 41 is a flat metal plate projecting forwardly of the shank into approximate alignment with the end of the tines 25, 27 of the fork. The forward edge of each shoe 39, 41 contains a notch 43, of radius slightly larger than the shaft 13. Notch 43 abuts with shaft 13 when coupled to the shock absorber and prevents shoe 39 or 41 from slipping laterally.

The bottom surface of each shoe 39, 41 engages and compresses against a coil of spring 11, and is inclined an angle $\alpha$, FIG. 2, that is at approximately the same angle of inclination as the coils of the spring to provide even contact. A line drawn across the engaging surface of the shoe perpendicular to the longitudinal axis of the lever arm 19 would intersect the longitudinal axis of the pin 31 at angle $\alpha$. The angles $\alpha$ are within the range of 5°–30°. Each shoe 39, 41 is inclined at an opposite angle to each other to correspond with coil springs of opposite winds. FIG. 2 shows shoe 39 engaging a left hand spring. FIG. 3 shows the installing apparatus inverted with shoe 41 engaging a right hand spring.

To remove a coil spring from a shock absorber, as shown by FIGS. 4 and 5, the tines 25, 27 are placed in alignment with the eye 15, and pin 31 is inserted to couple the installing apparatus to the shock absorber. This coupling forms the fulcrum point for lever arm 19. A shoe 39, or 41, depending on the type of coil spring, is inserted between two coils, with the notch 43 in abutment with shaft 13. Lever arm 19 is then manually moved toward the spring, compressing the coils. Keeper 17 is then withdrawn and the spring allowed to expand to its natural state. Normally it will slide over eye 15.

To install a spring, initially the spring is inserted over eye 15. In its natural state, the spring will slightly overlap eye 15, but normally does not extend higher than the passage through which pin 31 is inserted. The installing device is coupled to the eye 15, then the spring is compressed by a shoe 39, 41 and the keeper 17 inserted.

It may be readily seen that an invention having significant advantages has been provided. The described apparatus aids in installing and removing springs by providing a fast and effective method to further compress the spring. It is simple in construction and adaptable to either left hand or right hand springs.

Although this invention has been described with a certain degree of particularity, it is understood that the present disclosure has been made only by way of example and that numerous changes in the details of construction and the combination may be resorted to without departing from the spirit of the scope of this invention.

I claim:

1. An for installing or removing a compressed coil spring encircling a shaft, comprising:
   a lever arm;
   a fork having two tines formed at the forward end of the lever arm;
   coupling means for coupling the forward ends of the tines with the shaft to form a fulcrum point;
   a shank pivotally attached between the tines and having a portion extending transverse to the longitudinal axis of the lever arm;
   a first shoe affixed to a first end of the shank, projecting forwardly for applying compression to the coil spring, the engaging surface of the shoe being inclined an angle $\alpha$ with respect to the longitudinal axis of the coupling means for mating evenly with the coils of the spring.

2. The apparatus according to claim 1 further comprising a second shoe affixed to a second end of the shank, the engaging surface of the second shoe being inclined at an opposite angle to the first shoe for mating evenly with coils of a spring wound opposite to the inclination of the first shoe.

3. The apparatus according to claim 1 wherein the coupling means comprises a detachable pin fitted across the tines of the fork adjacent their ends.

4. The apparatus according to claim 1 wherein each shoe comprises a flat plate having a notch on its forward edge for abutting with the shaft to prevent slippage.

5. The apparatus according to claim 1 wherein the angle $\alpha$ is within the range of 5°–30°.

* * * * *